United States Patent
Demirdjian et al.

(10) Patent No.: US 8,396,825 B2
(45) Date of Patent: Mar. 12, 2013

(54) METHOD AND SYSTEM TO RECOGNIZE TEMPORAL EVENTS USING ENHANCED TEMPORAL DECISION TREES

(75) Inventors: David Demirdjian, Somerville, MA (US); Steve F. Kalik, Arlington, MA (US)

(73) Assignee: Toyota Motor Engineering & Manufacturing North America, Erlanger, KY (US)

( * ) Notice: Subject to any disclaimer, the term of this patent is extended or adjusted under 35 U.S.C. 154(b) by 903 days.

(21) Appl. No.: 12/392,874

(22) Filed: Feb. 25, 2009

(65) Prior Publication Data

US 2010/0217744 A1    Aug. 26, 2010

(51) Int. Cl.
*G06F 17/00* (2006.01)
*G06N 7/00* (2006.01)

(52) U.S. Cl. ............................ 706/58; 382/224; 704/235
(58) Field of Classification Search ..................... 706/58
See application file for complete search history.

(56) References Cited

U.S. PATENT DOCUMENTS

| | | | |
|---|---|---|---|
| 5,666,518 A | 9/1997 | Jumper | |
| 6,564,198 B1 | 5/2003 | Narayan et al. | |
| 6,701,195 B2 | 3/2004 | Brown et al. | |
| 6,947,797 B2 | 9/2005 | Dean et al. | |
| 7,062,447 B1 | 6/2006 | Valentine et al. | |
| 7,203,635 B2 | 4/2007 | Oliver et al. | |
| 2003/0209893 A1* | 11/2003 | Breed et al. | 280/735 |
| 2004/0024773 A1* | 2/2004 | Stoffel et al. | 707/102 |
| 2004/0073414 A1 | 4/2004 | Bienenstock et al. | |
| 2004/0193413 A1 | 9/2004 | Wilson et al. | |
| 2007/0233435 A1 | 10/2007 | Bradski | |
| 2008/0027688 A1 | 1/2008 | Jiang et al. | |
| 2008/0071721 A1 | 3/2008 | Wang et al. | |
| 2008/0208546 A1 | 8/2008 | Hutter et al. | |
| 2009/0115635 A1* | 5/2009 | Berger et al. | 340/943 |

OTHER PUBLICATIONS

Luca Console et al., "Temporal Decision Trees: Model-based Diagnosis of Dynamic Systems On-Board," Journal of Artificial Intelligence Research, vol. 19, pp. 469-512, 2003.

Seong-yong Koo et al., "Online Touch Behavior Recognition of Hard-cover Robot Using Temporal Decision Tree Classifier," Proceedings of the 17th IEEE International Symposium on Robot and Human Interactive Communication Aug. 1-3, 2008, pp. 425-429.

* cited by examiner

*Primary Examiner* — Kakali Chaki
*Assistant Examiner* — Kalpana Bharadwaj
(74) *Attorney, Agent, or Firm* — Oblon, Spivak, McClelland, Maier & Neustadt, L.L.P.

(57) ABSTRACT

An enhanced temporal decision tree is described that allows a temporal feature to be tested at a node not merely at a given time instant but, rather, over a time window. Further, the recorded temporal data can be multi-source, with features recorded from multiple sources; multi-resolution, through subsampling; multi-scale, based on varying time windows; and multi-domain, through sampling in the frequency domain, for example. By allowing features to be tested over a time window, enhanced temporal decision trees can be used to classify any temporal data or time series.

14 Claims, 7 Drawing Sheets

Classification of (static) feature $x = (c_1, c_2, \ldots, c_N)$

| | data type | feature | sampling rate |
|---|---|---|---|
| 501 | physiological | chest volume | 250 samples/sec |
| 510 | imaging | mouth image | 30 frames/sec |

METHOD AND SYSTEM TO RECOGNIZE TEMPORAL EVENTS USING ENHANCED TEMPORAL DECISION TREES

BACKGROUND OF THE INVENTION

1. Field of the Invention

The present invention relates generally to a system and method for recognizing temporal events using enhanced temporal decision trees that act on features of data over a time window.

2. Description of the Related Art

Figure 1:
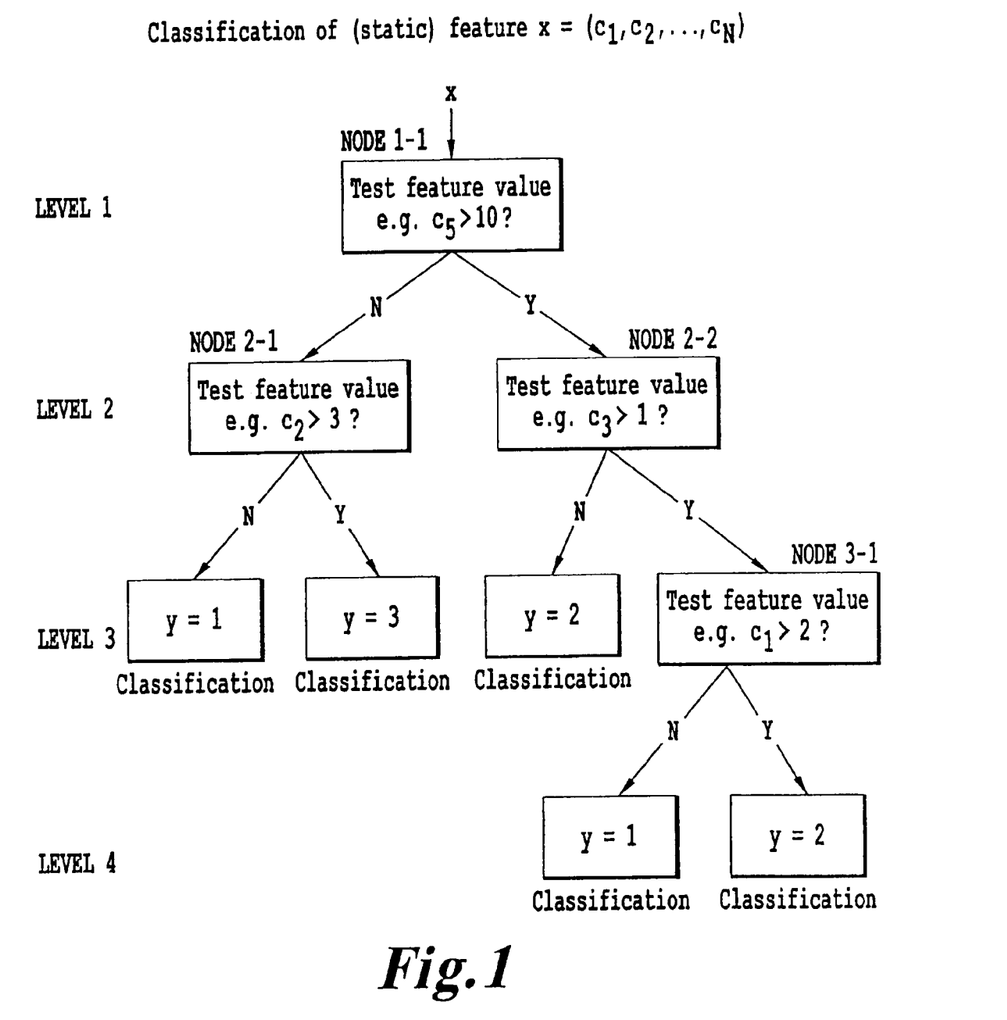
FIG. 1 depicts exemplary structure of a traditional decision tree.

In machine learning, a decision tree is a predictive model that classifies or maps observations to thereby recognize events. The structure of a traditional decision tree is illustrated at FIG. 1. The features, $c_1$ through $C_N$, represent variables to be tested at the nodes of the decision tree, and the result of each test determines if another feature is tested at a node one level lower or if a classification is made. For example, the result of a test of the feature $c_5$ at node 1-1 leads to either another test at node 2-1 or at node 2-2. The result of a test of the feature c3 at node 2-2 leads to either a classification or another test at node 3-1, which is one level lower on the decision tree than node 2-2.

As discussed in the paper, Kwon D., et al., "Online Touch Behavior Recognition of Hard-cover Robot Using Temporal Decision Tree Classifier," Journal of Artificial Intelligence Research, In Proceedings of IEEE RO-MAN 2008 (2008), the traditional decision tree has been further developed to account for classifications that are based on temporal or time-related features. The Kwon, et al. paper describes a temporal decision tree for classifying the type of touch given to a robot. The section detailing multi-windowing feature extraction explains that four features, force, contact time, repetition, and changes in contact area, are used to characterize the touch and that each of the features is calculated after a certain period of sampling. For example, force is calculated based on 20 acceleration data samples. The sample window within which the 20 acceleration data samples are acquired is moved every 10 ms. Thus, force(1) is calculated based on 20 acceleration data samples in the first sample window, and force(n) is calculated based on 20 acceleration data samples in the nth sample window.

Figure 2:
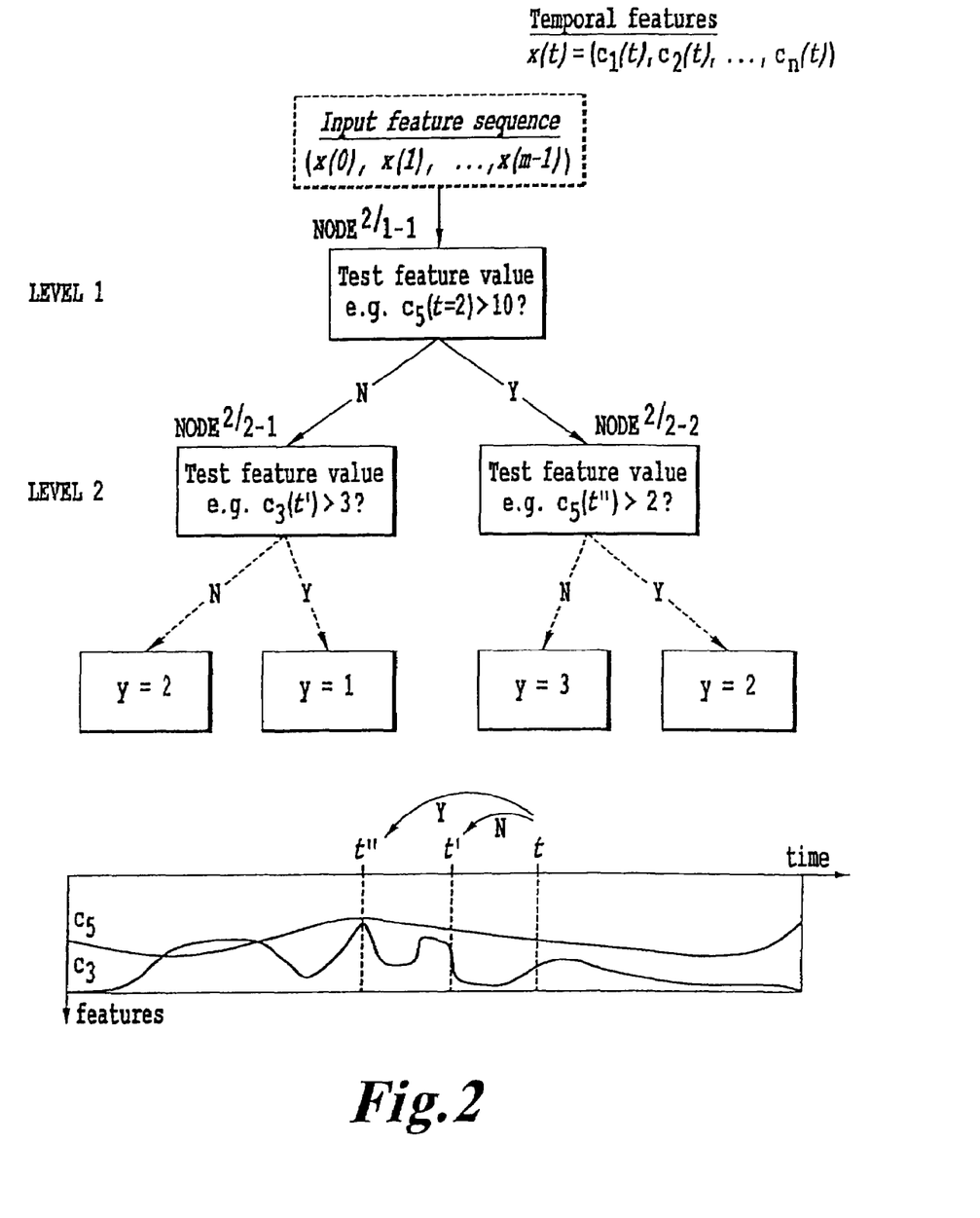
FIG. 2 depicts exemplary structure of a standard temporal decision tree.

The structure of a standard temporal decision tree is illustrated at FIG. 2. The standard temporal decision tree, depicted at FIG. 2, differs from the traditional decision tree, depicted at FIG. 1, by using temporal features such that the test at each node is of a feature at a given time in a time sequence. For example, the value of feature c3 at t-t' is tested at node 2/2-1. In relation to the Kwon, et al. paper discussed above, for example, a node may test force(3) at a node.

SUMMARY OF THE INVENTION

Standard temporal decision trees use temporal data sources and account for feature values that can only be computed after a certain period of time. However, standard temporal decision trees do not account for features values that can only be computed over a period of time.

The present invention was developed through the recognition of a need to make decisions at nodes based on feature values over a time window in order to recognize additional types of events.

A method of recognizing events by processing temporal data from at least one data source with a temporal decision tree comprising nodes at different levels of the temporal decision tree structure is described. The method includes recording data samples sequentially at a predetermined interval from the at least one data source, processing the data samples with the temporal decision tree, the processing including testing a feature of the data samples from the at least one data source for a predetermined time window at a node, and based on a result of the testing, making a decision regarding an event or testing another feature at a node at a next level below the previous node.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

The structure of decision trees and machine learning to establish decision trees are readily understood by those of skill in the art. Thus, this application does not provide details on the formation and structure of decision trees beyond those needed for an explanation of the invention.

Figure 3:
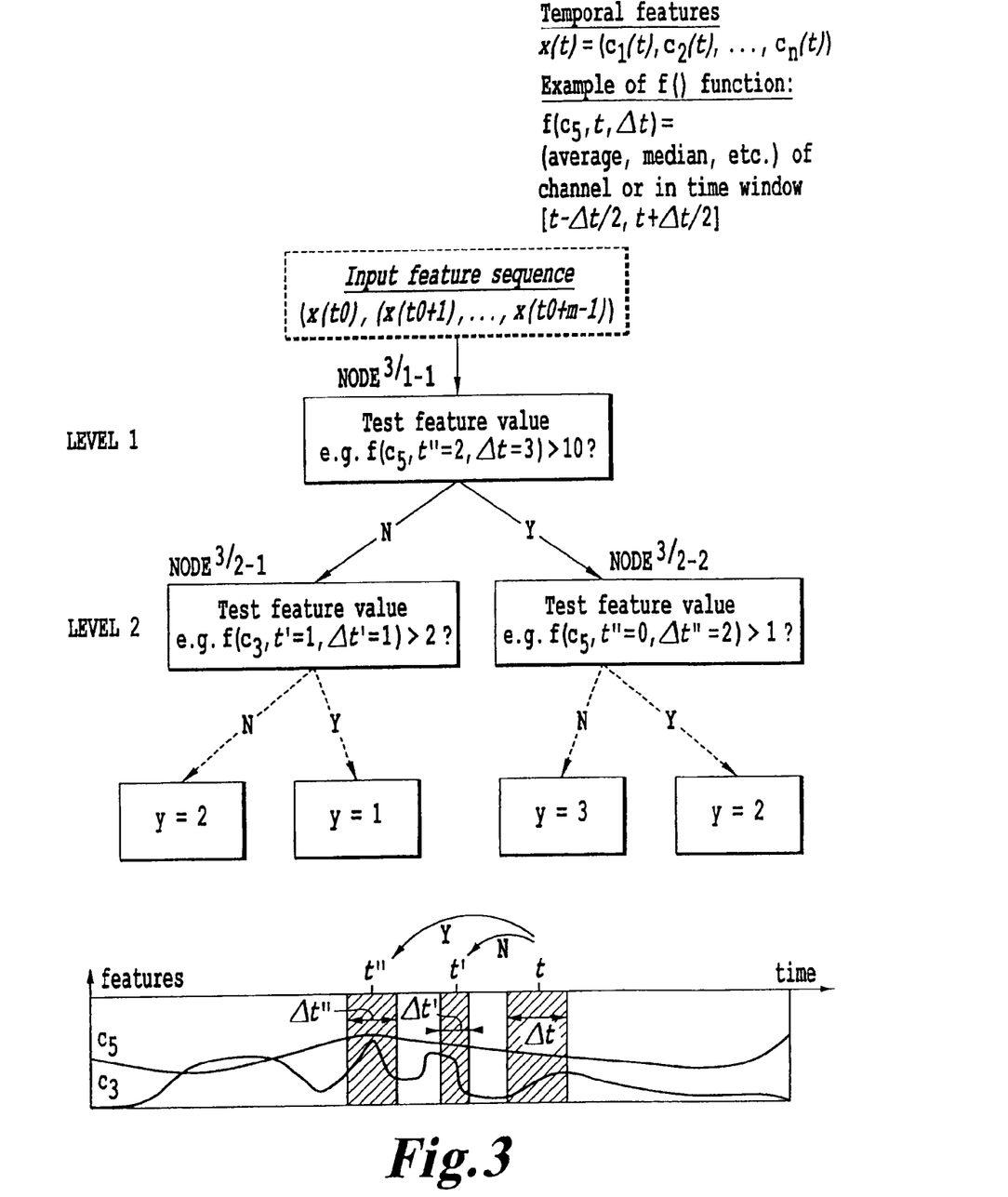
FIG. 3 depicts exemplary structure of an enhanced temporal decision tree.

FIG. 3 illustrates structure of a non-limiting embodiment of an enhanced temporal decision tree. For example, at node 3/2-2, a function of feature $C_5$ is tested not just at a time 0, but for a time window of 2 around the time 0. A feature is an aspect of data that is tested at a node, such as the data value itself, or a function of that value, such as an average, median, etc.

An enhanced temporal decision tree uses features that are sequential samples over a time window, as depicted at FIG. 3. Further, features at different nodes can be selected on different scales by using different time windows or window sizes, thereby creating multi-scale features. Still further, subsampling temporal signals results in multi-resolution features and sampling over a different domain, such as over the frequency domain in addition to the time domain, creates multi-domain features.

Features can be multi-source features, as well. Multi-source features can result from multiple inputs to a single sensor or inputs to multiple sensors. Further, when a multi-source feature is tested at a node, each component of the multi-source feature may have a different time window.

A non-limiting example of a multi-source feature for explanatory purposes is a combination of an electrocardiogram (ECG) output and a finger pulse oximeter output. A node may test a combination of the ECG output at a first time window and the pulse oximeter output at a second time window which lags the first time window.

Because a feature is computed over a time window only when the node at which that particular feature is tested is reached, overall computational efficiency of the enhanced temporal decision tree is increased.

By using features that are sequentially sampled over a time window, multi-scale features, multi-resolution features, multi-domain features, and multi-source features, enhanced temporal decision trees can be used to recognize events that could otherwise not be recognized with traditional and standard temporal decision trees.

One of ordinary skill will readily recognize that enhanced temporal decision trees can be used to classify any temporal data or time series. Other non-limiting exemplary applications include: financial analysis; diagnostics of systems such as biological, electrical, mechanical, chemical, or physical systems; classification of dynamic system structure or behavior; audio sequence recognition, such as speech recognition and musical theme or component recognition; behavior classification; and evolutionary trend analysis.

Enhanced temporal decision trees can recognize physiological events, for example, that require a decision regarding a feature, such as, for example, an ECG output, over a time window rather than only at a moment in time.

Gesture recognition is another example of recognition that is possible with visual-based input and an enhanced temporal decision tree that makes a decision regarding image-related features, such as, for example, hand movements, over a time window to determine the gesture, rather than being limited to testing a hand position, for example, at a fixed period of time that would not yield the movement information needed to recognize the gesture.

For a clearer explanation of testing a feature over a time window in an enhanced temporal decision tree, a non-limiting example is discussed with reference to FIG. 4.

Figure 4A:
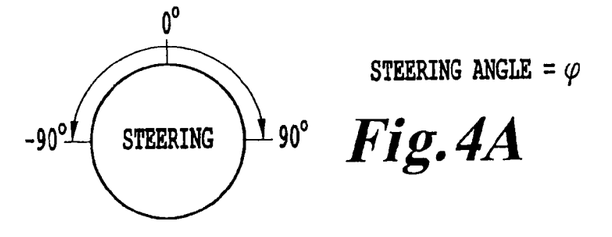
FIG. 4 illustrates a non-limiting exemplary application of recognizing events in vehicle control during driving by processing temporal data with an enhanced temporal decision tree.

FIG. 4A depicts the steering angle that would be recorded by a data source of an enhanced temporal decision tree as the steering wheel is turned. An increasing turn of the wheel to the right causes the data source of the enhanced temporal decision tree to record an angle, $\phi$, from 0 to 90 deg., while an increasing turn of the wheel to the left causes the data source of the enhanced temporal decision tree to record an angle, $\phi$, from 0 to −90 deg.

Figure 4B:
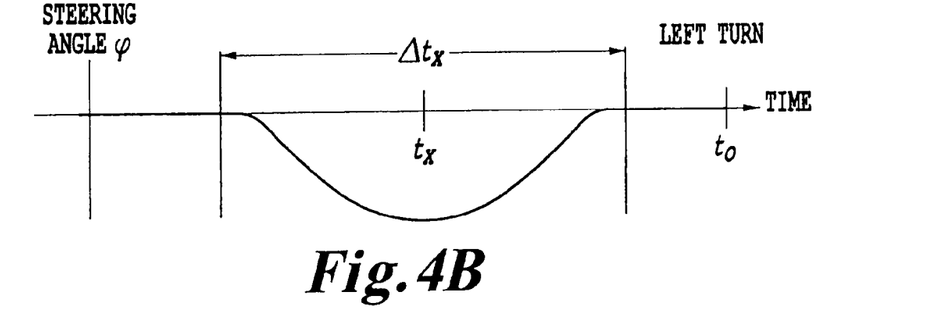

A left turn causes the data source of the enhanced temporal decision tree to record $\Phi$ values that are increasingly negative, up to the steepest part of the turn, and that increase back to 0 deg. at the completion of the turn, as depicted at FIG. 4B.

Figure 4C:
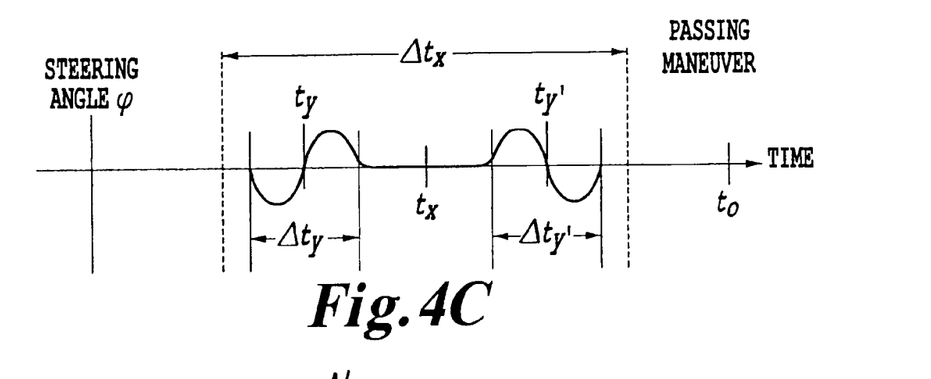

The steering angle for a passing maneuver from the left lane is depicted at FIG. 4C. The steering angle recorded by the data source of the enhanced temporal decision tree for a passing maneuver to the left lane, with a straight stretch followed by a shift back to the right lane is depicted within the time window $\Delta tx$.

Figure 4D:
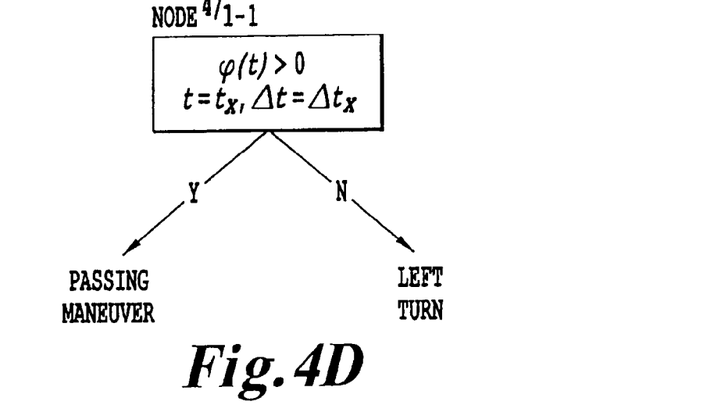

The enhanced temporal decision tree depicted at FIG. 4D can be used to recognize and distinguish a left turn from a passing maneuver from the left. At node 4/1-1, $\phi$ is tested over a time window $\Delta tx$ centered at tx, and if none of the values of $\phi$ in the time window $\Delta tx$ are positive, then a left turn is recognized. If, instead, any of the values of $\phi$ in the time window $\Delta tx$ are positive, then a passing maneuver is recognized.

The simplified tree structure depicted at FIG. 4 could be part of a larger enhanced temporal decision tree. For example, nodes at higher levels could be used to identify tx. Further, the enhanced temporal decision tree could have analogs to the depicted node for different vehicle speed ranges. The value of tx could be determined through testing for the range of speed and other conditions determined at higher level nodes.

For an illustration of multi-scale and multi-source features, another simplified non-limiting example is discussed with reference to FIG. 5.

Figure 5A:
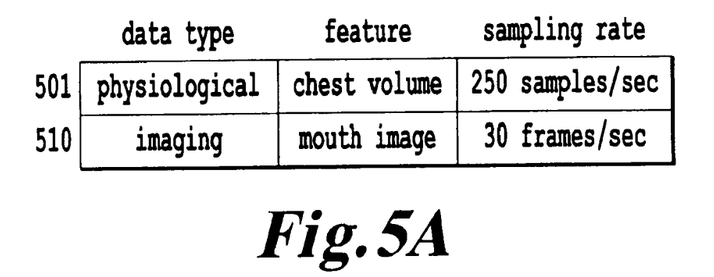
FIG. 5 illustrates a non-limiting exemplary application of recognizing a physiological event by processing multi-scale, multi-resolution, and multi-source features in temporal data with an enhanced decision tree.
Figure 5B:
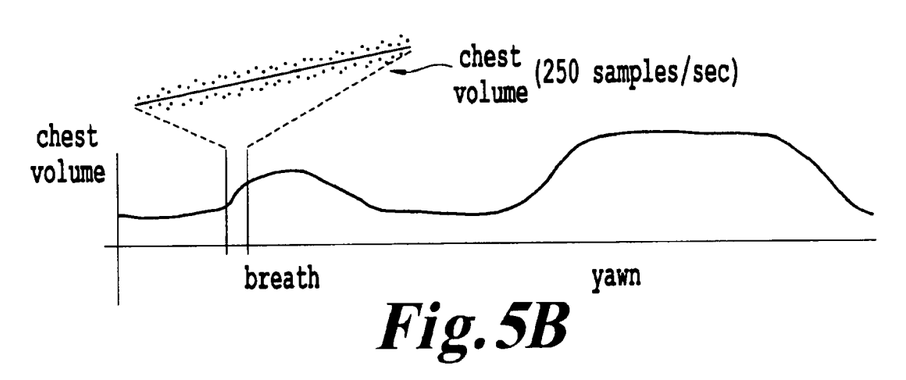
Figure 5C:
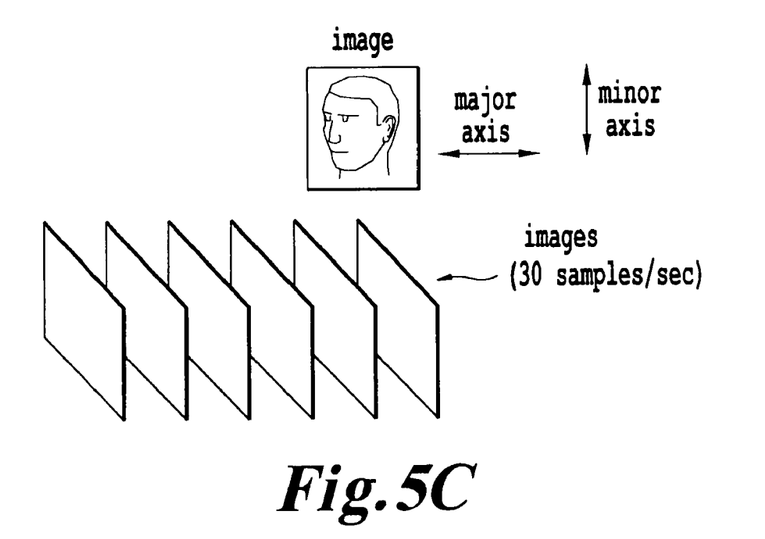
Figure 5D:
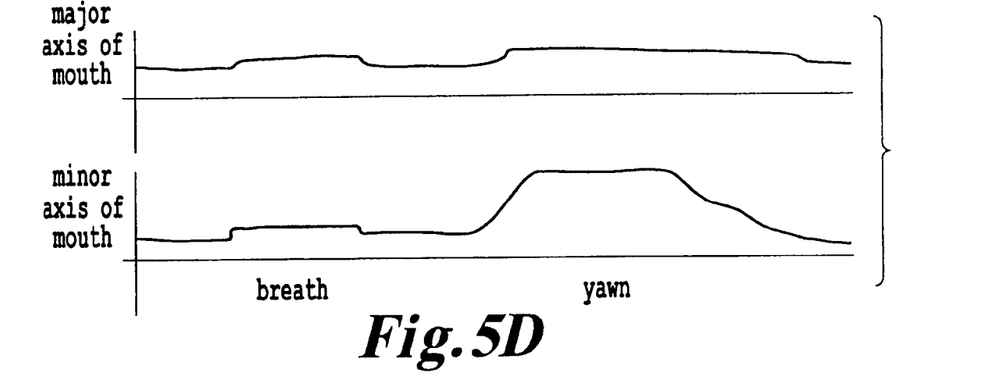

FIG. 5A details the data collected by the multiple data sources 501 and 510. The first 501, collects physiological data of chest volume sampled at 250 samples per second, as depicted at FIG. 5B. The second, 510, collects imaging data of an image of a mouth sampled at 30 frames per second, as depicted at FIG. 5C, with the major and minor axis data depicted at FIG. 5D.

Figure 5E:
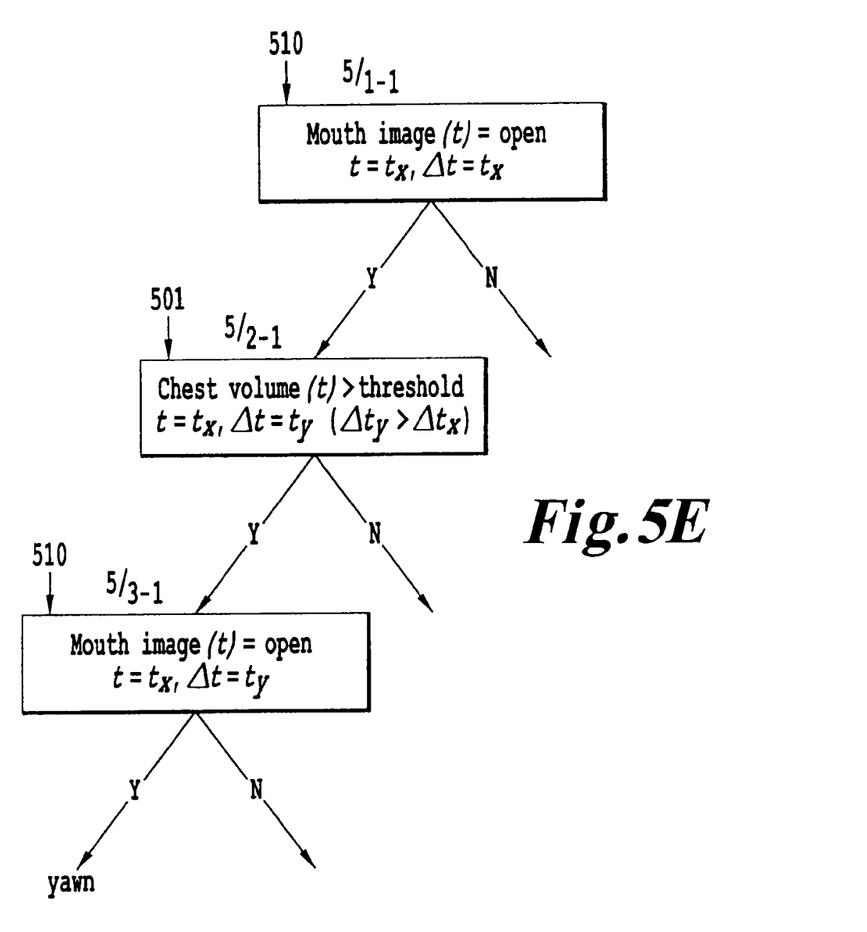

The enhanced temporal decision tree depicted at FIG. 5E can be used to recognize a yawn, which is a physiological event with both physiological signals, like respiration event size (chest volume), heart rate, and blood pressure, as well as image signals, like hand, arm, head, eye, and mouth movements.

The enhanced temporal decision tree of FIG. 5E uses multi-source features from sources 501 and 510 and also samples of the mouth image, which could be features associated with the major axis, minor axis, or a combination of the two, at different time windows at nodes 5/1-1 and 5/3-1, for a depiction of multi-scale features. Although not depicted in this example, data from either of the sources could be sub-sampled, for example, every 2nd sample of mouth image data could be tested at node 5/3-1 for an illustration of multi-resolution features.

While the simplified example serves to depict the use of multi-source and multi-scale features, one of ordinary skill in the art would readily recognize that a much more complex enhanced temporal decision tree could be built from the foundation depicted at FIG. 5E to account for simultaneous arm and hand movements, heart rate, and other features that accompany the event of a yawn.

Further, each of the features collected with the different data sources in the more complex version could be tested at nodes at different resolutions, different scales, and in different domains.

Figure 6:
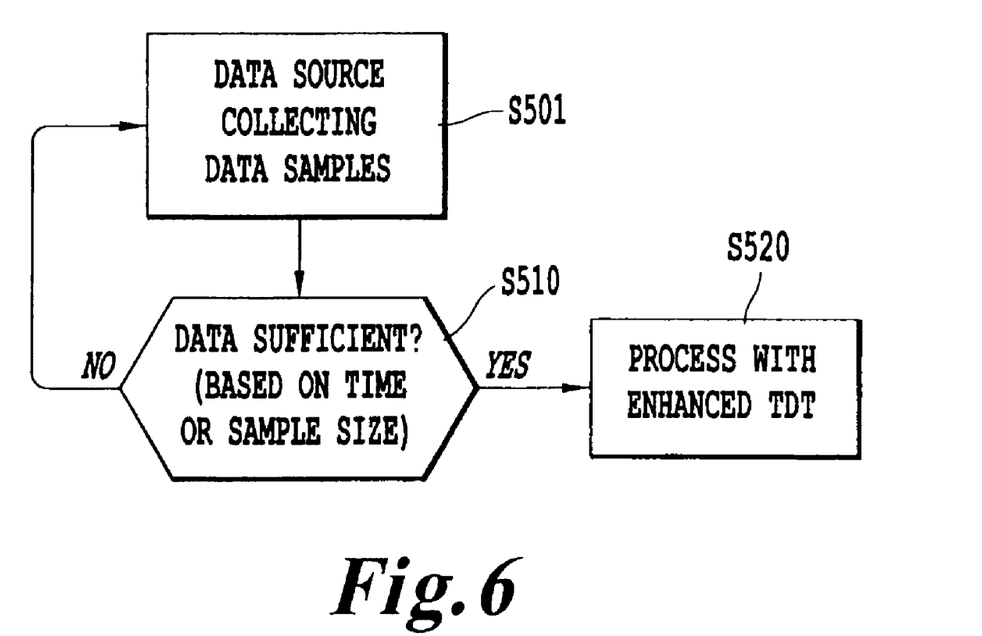
FIG. 6 illustrates a method of recognizing events on an on-going basis by processing temporal data with an enhanced temporal decision tree.

As depicted at FIG. 6, event recognition can be done on an on-going basis. At step S501, a data source collects data continuously at a predetermined interval. A determination is made at step S510 of whether sufficient feature values are collected. Once it is determined at S510 that a sufficient feature set is collected, the feature values are processed by the enhanced temporal decision tree at step S520.

Based on the discussion of multi-sensor features above, one of ordinary skill in the art would readily understand that FIG. 6 could be modified to depict multiple data sources that collect data continuously at the same or at different predetermined intervals. Further, pre-recorded data could also be used by the enhanced temporal decision tree such that each of the data sources may include data recorded at different times as well as at different intervals. Still further, based on the rate of processing by the enhanced temporal decision tree, the rate of data collection, and the type of processing, there could be overlaps in the feature set used in two or more processing sequences.

Figure 7:
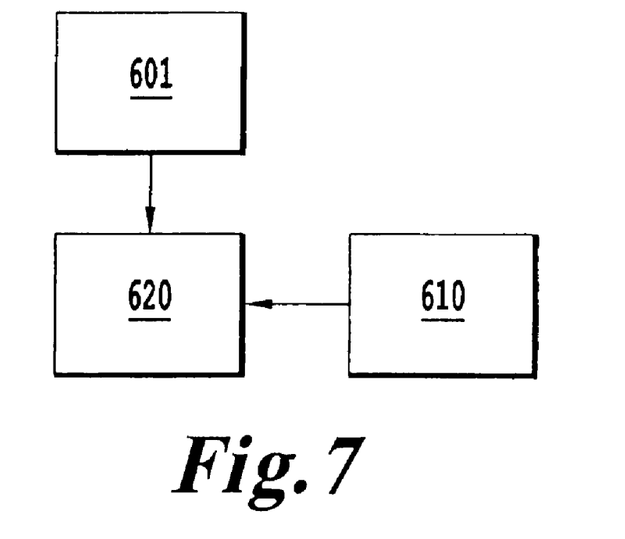
FIG. 7 depicts a system that recognizes events based on temporal data.

Additionally, as depicted at FIG. 7, the enhanced temporal decision tree could be implemented by a processor 620 running instructions from a storage medium 610 with temporal features from the storage 601. The instructions and features could be stored in the same storage medium. Each of a plurality of data sources could have their own storage 601 from which the processor 620 acquires features.

With regard to a processor and storage medium(s), microprocessors used to perform the methods of the present invention could utilize a computer readable storage medium, such as a memory (e.g. ROM, EPROM, EEPROM, flash memory, static memory, DRAM, SDRAM, and their equivalents), but, in an alternate embodiment, could further include or exclusively include a logic device for augmenting or fully implementing the present invention. Such a logic device includes, but is not limited to, an application-specific integrated circuit (ASIC), a field programmable gate array (FPGA), a generic-array of logic (GAL), an Electronic Control Unit (ECU), and their equivalents. The microprocessors can be separate devices or a single processing mechanism.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of recognizing events, implemented by a processor in an event recognition system, processing temporal data from at least one data source with a temporal decision tree comprising nodes at different levels of the temporal decision tree structure, the method comprising:
    recording data samples sequentially at a predetermined interval from the at least one data source; and
    processing the data samples with the temporal decision tree, the processing including:
        testing at least one feature of the data samples from the at least one data source for a predetermined time window at a node of the temporal decision tree, the predetermined time window being a discrete time period within a time domain of the recorded sequential data samples, and
        based on a result of the testing, making a decision regarding an event or testing a same or a different feature at a node at a next level below a previous node.

2. The method according to claim 1, wherein the at least one data source outputs physiological data.

3. The method according to claim 1, wherein the at least one data source outputs image data.

4. The method according to claim 1, wherein the feature includes data samples, recorded from the at least one data source, or operations performed on the data samples.

5. The method according to claim 1, wherein the events include physiological events or gestures.

6. The method according to claim 1, wherein the events include system behaviors.

7. A computer-readable storage medium storing instructions therein which, when executed by a processor, cause the processor to execute steps of an event recognition method using data samples, recorded by at least one data source and stored in at least one data storage medium, the steps comprising:
    testing at least one feature of the data samples from the at least one data source for a predetermined time window at a node of a decision tree, the predetermined time window being a discrete time period within a time domain of the data samples, and
    based on a result of the testing, making a decision regarding the event or testing a same or a different feature at a node at a next level below a previous node.

8. The medium according to claim 7, wherein the processor is an Electronic Control Unit (ECU) in an automobile.

9. A system configured to recognize events, the system comprising:
    at least one data source, the data source recording the data at a predetermined time interval to output or to store in a first storage medium;
    a second storage medium storing a set of instructions for processing the data;
    a processor executing the set of instructions stored in the second storage medium to process the data with a decision tree including nodes, each node configured to test at least one feature of the data over a predetermined time window, the predetermined time window being a discrete time period within a time domain of the data.

10. The method according to claim 1, wherein the processing of the temporal data includes processing temporal data from at least first and second data sources respectively providing physiological and image data, such that the temporal data includes the physiological data and the image data.

11. The method according to claim 10, wherein the testing includes testing one of the physiological data and the image data at a first node for the predetermined time window, and then testing the other of the physiological data and the image data at a second node for another predetermined time window.

12. The method according to claim 11, wherein the testing further includes testing the one of the physiological data and the image data at a third node for the another predetermined time window, after the testing at the second node.

13. The method according to claim 12, wherein the another predetermined time window is longer in time than the predetermined time window.

14. The method according to claim 13, further comprising:
    determining a physiological event has occurred based on the testing at the third node.

* * * * *